(12) United States Patent
Finley et al.

(10) Patent No.: US 7,473,471 B2
(45) Date of Patent: Jan. 6, 2009

(54) COATING COMPOSITION WITH SOLAR PROPERTIES

(75) Inventors: James J. Finley, Pittsburgh, PA (US); James P. Thiel, Pittsburgh, PA (US); Harry Buhay, Allison Park, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 245 days.

(21) Appl. No.: 11/084,989

(22) Filed: Mar. 21, 2005

(65) Prior Publication Data

US 2006/0210809 A1 Sep. 21, 2006

(51) Int. Cl.
*B32B 15/04* (2006.01)

(52) U.S. Cl. .......... 428/432; 428/433; 428/434

(58) Field of Classification Search .......... None
See application file for complete search history.

(56) References Cited

U.S. PATENT DOCUMENTS

| | | | |
|---|---|---|---|
| 3,083,551 A | 4/1963 | Pilkington | 65/32 |
| 3,220,816 A | 11/1965 | Pilkington | 65/99 |
| 3,660,061 A | 5/1972 | Donley et al. | 65/32 |
| 3,843,346 A | 10/1974 | Edge et al. | 65/65 A |
| 4,111,150 A | 9/1978 | Donley et al. | 118/7 |
| 4,193,236 A | 3/1980 | Mazzoni et al. | 52/172 |
| 4,379,040 A | 4/1983 | Gillery | 204/192 P |
| 4,464,874 A | 8/1984 | Shea, Jr. et al. | 52/398 |
| 4,719,126 A | 1/1988 | Henery | 427/165 |
| 4,719,127 A | 1/1988 | Greenberg | 427/165 |
| 4,853,257 A | 8/1989 | Henery | 427/166 |
| 4,861,669 A | 8/1989 | Gillery | 428/434 |
| 4,900,633 A | 2/1990 | Gillery | 428/432 |
| 4,971,843 A | 11/1990 | Michelotti et al. | 428/34 |
| 5,088,258 A | 2/1992 | Schield et al. | 52/398 |
| 5,106,663 A | 4/1992 | Box | 428/34 |
| 5,464,657 A | 11/1995 | Athey et al. | 427/255.5 |
| 5,536,718 A | 7/1996 | Albright et al. | 514/220 |
| 5,599,387 A | 2/1997 | Neuman et al. | 106/287.14 |
| 5,800,933 A | 9/1998 | Hartig et al. | 428/622 |
| 5,948,131 A | 9/1999 | Neuman | 65/60.2 |
| 6,797,389 B1 | 9/2004 | Depauw | 428/432 |
| 6,869,644 B2 | 3/2005 | Buhay et al. | 427/419.2 |
| 2002/0136905 A1* | 9/2002 | Medwick et al. | 428/432 |
| 2003/0049463 A1 | 3/2003 | Wang | 428/432 |
| 2004/0023080 A1 | 2/2004 | Buhay et al. | 428/702 |

FOREIGN PATENT DOCUMENTS

| | | |
|---|---|---|
| EP | 1 498 397 A1 | 1/2005 |
| WO | 99/25661 | 5/1999 |
| WO | 2005/108064 A2 | 11/2005 |

* cited by examiner

*Primary Examiner*—Timothy M Speer
(74) *Attorney, Agent, or Firm*—Andrew C Siminerio

(57) ABSTRACT

A coating composition is disclosed. The coating composition includes an infrared reflective layer; a primer layer over the infrared reflective layer; a dielectric layer over the primer layer; and an absorbing layer, wherein the absorbing layer can be either under the infrared reflective layer or over the dielectric layer.

8 Claims, No Drawings

US 7,473,471 B2

COATING COMPOSITION WITH SOLAR PROPERTIES

FIELD OF THE INVENTION

The present invention relates to a coating composition that can be applied on substrates to provide a coated substrate that exhibits low visible light transmittance and low visible light reflectance from at least one side of the substrate.

BACKGROUND OF THE INVENTION

Privacy glass, defined as glass which has a low visible transmittance (i.e., less than or equal to 50%), can be used in a variety of applications such as automotive applications and architectural applications. There are generally no limitations regarding where privacy glass can be incorporated in a building. In some automotive applications, privacy glass can only be incorporated in the rear window and rear sidelights due to the regulations imposed in the United States and some other countries.

Typically, a substrate, either coated or uncoated, that will be used as privacy glass is highly absorbtive or is highly reflective in the visible region of the electromagnetic spectrum. For example, the privacy glass can comprise an uncoated, tinted glass substrate with good absorptive properties in the visible region. In the alternative, the privacy glass can comprise a coated, clear glass substrate with high reflectivity in the visible region. In another alternative embodiment, the privacy glass can comprise a laminated product formed, for example, with a tinted substrate and a clear, coated substrate.

The present invention provides a novel coating that can be used to transform a glass substrate into privacy glass. The coated substrate of the present invention exhibits reduced visible reflectance, which is aesthetically desirable, while providing solar reflection in the infrared region on at least one side of the substrate which reduces the heat load.

SUMMARY OF THE INVENTION

In a non-limiting embodiment, the present invention is a coating composition comprising: an infrared reflective layer; a primer layer over the infrared reflective layer; a dielectric layer over the primer layer; and an absorbing layer, wherein the absorbing layer can be either under the infrared reflective layer or over the dielectric layer.

In another non-limiting embodiment, the present invention is a coated substrate comprising: a substrate; an infrared reflective layer over the substrate; a primer layer over the infrared reflective layer; a dielectric layer over the primer layer; and an absorbing layer, wherein the absorbing layer can be either under the infrared reflective layer or over the dielectric layer.

In yet another non-limiting embodiment, the present invention is a method for forming a coating comprising: depositing an infrared reflecting layer; depositing a primer layer over the infrared reflective layer; depositing a dielectric layer over the primer layer; and depositing an absorbing layer, wherein the absorbing layer can be deposited either under the infrared reflective layer or over the dielectric layer, and wherein when the coating is deposited on a 0.16 inch thick clear glass substrate, the substrate exhibits an Lta of less than or equal to 50% and an L* of equal to or less than 52 from at least one side of the substrate

DESCRIPTION OF THE INVENTION

All numbers expressing dimensions, physical characteristics, quantities of ingredients, reaction conditions, and the like used in the specification and claims are to be understood as being modified in all instances by the term "about". Accordingly, unless indicated to the contrary, the numerical values set forth in the following specification and claims may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques. Moreover, all ranges disclosed herein are to be understood to encompass any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more and ending with a maximum value of 10 or less, e.g., 1.0 to 7.8, 3.0 to 4.5, and 6.3 to 10.0.

As used herein, the terms "on", "applied on/over", "formed on/over", "deposited on/over", "overlay" and "provided on/over" mean formed, overlay, deposited, or provided on but not necessarily in contact with the surface. For example, a coating layer "formed over" a substrate does not preclude the presence of one or more other coating layers of the same or different composition located between the formed coating layer and the substrate. For instance, the substrate can include a conventional coating such as those known in the art for coating substrates, such as glass or ceramic.

In a non-limiting embodiment, the present invention is a coating composition comprising one or more infrared reflecting layers, one or more primer layers, one or more dielectric layers, and one or more absorbing layers capable of absorbing at least a portion of energy in the visible region of the electromagnetic spectrum.

According to the present invention, the one or more infrared reflective layers can comprise gold, copper, silver and mixtures thereof as is well known in the art.

According to the present invention, the infrared reflective layer(s) can be deposited using any of the standard techniques such as chemical vapor deposition ("CVD"), spray pyrolysis, magnetron sputtering vapor deposition ("MSVD") which are well known in the art. If the coating layer is made up of more than one discrete film, the described deposition techniques can be used to deposit some or all of the films that make up the total coating layer.

Suitable CVD methods of deposition are described in the following references, which are hereby incorporated by reference: U.S. Pat. Nos. 4,853,257; 4,971,843; 5,536,718; 5,464,657; 5,599,387; and 5,948,131.

Suitable spray pyrolysis methods of deposition are described in the following References, which are hereby incorporated by reference: U.S. Pat. Nos. 4,719,126; 4,719,127; 4,111,150; and 3,660,061.

Suitable MSVD methods of deposition are described in the following references, which are hereby incorporated by reference: U.S. Pat. Nos. 4,379,040; 4,861,669; and 4,900,633.

The infrared reflective layer(s) can have any thickness. In a non-limiting embodiment, the thickness of each infrared reflective layer can range from 50 Å to 200 Å, for example, from 70 Å to 160 Å or from 90 Å to 130 Å.

According to the present invention, one or more primer layers can be over the infrared reflective layer(s). The primer layer acts as a sacrificial layer that protects the infrared reflective layer from oxidizing conditions. By acting as a sacrificial layer, the primer layer oxidizes instead of the infrared reflective layer. In a non-limiting embodiment of the invention, the primer layer comprises a material selected from titanium, zirconium, and mixtures thereof.

The primer layer(s) can be deposited using any of the standard techniques discussed above in relation to the infrared reflective layer.

The primer layer(s) can have any thickness. In a non-limiting embodiment, the thickness of each primer layer can range from 1 Å to 60 Å, for example, from 10 Å to 35 Å or from 12 Å to 25 Å.

According to the present invention, one or more dielectric layers can be over the primer layer(s). The dielectric layer can be made up of a single film or a plurality of films. Suitable materials for the dielectric layer include, but are not limited to, metal oxides, oxides of metal alloys, nitrides, oxynitrides, or mixtures thereof. Examples of suitable metal oxides include, but are not limited to, oxides of titanium, hafnium, zirconium, niobium, zinc, bismuth, lead, indium, tin, and mixtures thereof. Additionally, the dielectric layer can comprise oxides of metal alloys or metal mixtures, such as, but not limited to, oxides containing zinc and tin, oxides of indium-tin alloys, silicon nitrides, silicon aluminum nitrides, oxynitrides, or aluminum nitrides.

In a non-limiting embodiment of the invention, the dielectric layer comprises a metal alloy oxide film comprising a zinc/tin alloy oxide. The zinc/tin alloy can comprise zinc and tin in proportions ranging from 10 wt. % to 90 wt. % zinc and 90 wt. % to 10 wt. % tin.

In a non-limiting embodiment of the invention, the dielectric layer comprises zinc stannate. The term "zinc stannate" refers to a composition of $Zn_XSn_{1-X}O_{2-X}$ (Formula 1) where x is greater than 0 but less than 1. For example, if x=2/3, the zinc stannate formed would be represented by $Zn_{2/3}Sn_{1/3}O_{4/3}$, which is commonly described as "$Zn_2SnO_4$". A zinc stannate containing coating has one or more of films according to Formula 1 in a predominant amount, i.e., zinc stannate is present in an amount greater than any other material in the coating.

In a non-limiting embodiment of the invention, the dielectric layer is made up of a material that is doped, for example, with antimony, nickel, boron, manganese, indium, etc. For example, the dielectric layer can comprise tin oxide doped with antimony or indium, silicon oxide doped with nickel or boron, zinc oxide doped with tin, etc.

If more than one dielectric layer is present in an embodiment of the present invention, the dielectric layers in the coating can have the same composition or a different compositions.

The dielectric layer(s) of the present invention can be deposited using standard techniques as discussed above in relation to the infrared reflective layer.

According to the present invention, the dielectric layer(s) can have any thickness. In a non-limiting embodiment, the thickness of each dielectric layer can range from 200 Å to 900 Å, for example, from 250 Å to 800 Å.

According to the present invention, one or more absorbing layers can be over the dielectric layer. The absorbing layer is capable of absorbing at least a portion of energy in the visible region of the electromagnetic spectrum to, among other things, reduce the luminous transmittance of the coated substrate. In a non-limiting embodiment of the invention, the absorbing layer comprises an alloy and/or mixture of (a) a metal having an index of refraction at 500 nm equal to or less than 1.0 and (b) a material that has a $\Delta G°_f$ of greater to or equal than $-100$ at $1,000°$ K. Examples of materials that have a $\Delta G°_f$ of greater to or equal than $-100$ at $1,000°$ K. include, but are not limited to, tin, indium, copper, zinc as well as mixtures thereof. A non-limiting example of the absorbing layer is an alloy and/or mixture of silver, which has an index of refraction at 500 nm of approximately 0.2, and tin.

In another non-limiting embodiment of the invention, the absorbing layer comprises nickel, stainless steel, chrome, molybdenum, tungsten, iridium, steel, iron, cobalt, cobalt as well as mixtures and alloys thereof.

In yet another non-limiting embodiment of the invention, the absorbing layer comprises oxides, nitrides, and carbides. For example, the absorbing layer can comprise one or more materials selected from oxides, nitrides and carbides of copper, manganese, titanium, iron, and chrome, as well as mixtures and alloys thereof.

According to the present invention, the absorbing layer(s) can be deposited using any of the standard techniques discussed above in relation to the infrared reflective layer. Other well known deposition techniques such as plasma spray, arc spray, casting, etc. can also be utilized with the present invention.

The absorbing layer(s) can have any thickness. In a non-limiting embodiment, the thickness of each absorbing layer can range from 20 Å to 300 Å, for example from 50 Å to 250 Å.

In addition to the coating composition discussed above, the present invention also encompasses a substrate coated with the described coating. According to the present invention, the coating described above can be deposited on a substrate. Suitable substrates include transparent materials such as, but not limited to, glass, ceramic, etc.

In a non-limiting embodiment of the invention, the substrate is glass made via conventional float glass process. Suitable float processes are described in U.S. Pat. Nos. 3,083,551; 3,220,816; and 3,843,346, which are hereby incorporated by reference. In another non-limiting embodiment of the invention, the substrate is a glass float ribbon.

In many instances, it is desirable to place the absorbing layer as far away as possible from a light source so the performance of any coating layers in the coating stack that have reflective properties will not be compromised. In a non-limiting embodiment, the present invention is a coating comprising an absorbing layer over a substrate; a first dielectric layer over the absorbing layer; a first infrared reflective layer over the first dielectric layer; a first primer layer over the first infrared reflective layer; and a second dielectric layer over the first primer layer. The described coating configuration from the "first infrared reflective layer" to the "second dielectric layer" can be repeated any number of times to form a multi-layer coating over the substrate having one, two, three or more infrared reflective layers.

In another non-limiting embodiments the present invention is a coating comprising a first infrared reflective layer over a substrate; a first primer layer over the first infrared reflective layer; a first dielectric layer over the first primer layer; and an absorbing layer. The described coating configuration from the "first infrared layer" to the "first dielectric layer" can be repeated any number of times before the absorbing layer is included to form a multi-layer coating over the substrate having one, two, three or more infrared reflective layers.

In a non-limiting embodiment, the coating, when applied to a 0.16 inch (4.1 mm) thick clear glass substrate, exhibits a visible light transmittance equal to or less than 70%, for example, equal to or less than 50%, or equal to or less than 40%, or equal to or less than 20%. As used herein, the term "clear glass" means a 0.16 inch thick glass substrate that exhibits a visible light transmittance of greater than 90%. The coating, when applied to a 0.16 inch thick clear glass substrate can also exhibit a luminance (L* as measured according the C.I.E. 1931 standard with illuminant D65 and a 10° observer) equal to or less than 52, for example, equal to or less than 40, or equal to or less than 30.

Although not required in the present invention, a protective overcoat as is well known in the art can be the last coating layer in the coating stack. In one non-limiting embodiment, the protective overcoat can be a mixture of alumina and silica as described in U.S. patent application Ser. No. 10/007,382 filed on Oct. 22, 2001, which is hereby incorporated by reference. The protective overcoat can also serve as a barrier layer to certain materials, e.g. oxygen.

Various performance properties of the coated substrate such as reflected color, transmitted color, etc. can be manipulated by varying the thicknesses of the respective coating layers in the coating stack. One of the major benefits of the coating of the present invention is its ability to exhibit a variety of reflected colors on both sides of a substrate. Since the coating of the invention absorbs in the visible spectrum and reduces the reflectance of the coating, the respective sides of the coated substrate can exhibit different colors.

The coated substrate of the present invention can be used in numerous automotive and architectural applications. For example, the coated substrate can be used as a sunroof in a car or truck. The coated substrate can also be used in residential homes and commercial buildings.

In a non-limiting embodiment, the coated substrate of the invention is incorporated in an insulating glass (IG) unit, as is well known in the art. The IG unit can include a first glass substrate spaced from a second glass substrate by a spacer assembly. The substrates are held in place by a sealant system to form a chamber between the two glass substrates, as is well known in the art. Examples of suitable IG units are disclosed in U.S. Pat. Nos. 4,193,236; 4,464,874; 5,088,258; and 5,106,663, which are hereby incorporated by reference.

A coated substrate according to the present invention can be utilized as the first and/or the second glass substrate in an IG unit. In a non-limiting embodiment, the coated substrate of the present invention is the first substrate, and the coating is on the surface facing the second glass substrate.

The present invention also encompasses a method for making the coated substrate described above. The method can comprise depositing an infrared reflecting layer over a substrate; depositing a primer layer over the infrared reflective layer; depositing a dielectric layer over the primer layer; and depositing an absorbing layer over the primer layer. In non-limiting alternative embodiments, the absorbing layer can be deposited at different locations in the coating stack.

The present invention also encompasses a method for forming an absorbent layer in a coated substrate after the coating has been deposited. More specifically, in a non-limiting embodiment, the method comprises depositing a first dielectric layer; depositing a first infrared reflective layer over the first dielectric layer; depositing a first primer layer over the first infrared reflective layer; depositing a second dielectric layer comprising a material having a $\Delta G°_f$ of greater to or equal than −100 at 1,000° K. over the first primer layer; depositing a second infrared reflective layer over the second dielectric layer; depositing a second primer over the second infrared reflective layer; depositing a protective overcoat which can serve as a barrier to oxygen over the infrared reflective layer; and heating the coating such that the metal ions in the second dielectric layer diffuse throughout the second infrared reflecting layer. The infrared reflective layer that contains the diffused metal ions after the heating step becomes the absorbing layer of the invention.

Depending on the amount of diffused metal ions in the absorbing layer, the infrared absorbing properties of the absorbing layer will be reduced. Generally, the more metal ions in the absorbing layer, the less reflective the layer is of infrared radiation. As a result, it is possible to manipulate the absorbance and reflectance properties of the absorbing layer by controlling the amount of metal ions that diffuse into the absorbing layer.

In order to manipulate the amount of metal ions from the dielectric layer, for example tin ions from a tin containing dielectric layer, that diffuse into the infrared reflective layer and convert it into the absorbing layer during heating, a blocking layer can be deposited between the dielectric layer which supplies the metal ions and the infrared reflective layer into which the metal ions diffuse. In a non-limiting embodiment, the blocking layer comprises a metal oxide layer having a thickness sufficient to inhibit the diffusion of metal ions into the infrared reflective layer. In a non-limiting embodiment of the invention, the blocking layer is selected from oxides of titanium, aluminum, zirconium, zinc and hafnium. The blocking layer can be any thickness. Typically, the blocking layer has a thickness of up to 60 Å, for example, up to 40 Å, for example, up to 20 Å.

EXAMPLES

The following non-limiting examples are included to illustrate the present invention.

Four examples were made. In the examples, the absorbing layer was not deposited, but rather was formed from the migration of tin ions in the zinc stannate dielectric layer into the first infrared reflective layer as discussed below.

The examples were made in the following manner. A first dielectric layer comprising a first film of zinc stannate and an overlying film of zinc oxide was deposited by MSVD on a 0.16 inch thick, clear glass substrate. The thickness of zinc stannate film of the first dielectric layer was 276 Å, and the thickness of the zinc oxide film was 160 Å.

A first infrared reflective layer of silver was deposited at a thickness of 118 Å over the first dielectric layer. A first primer layer of titanium was deposited over the first silver layer at a thickness of 30 Å. A second dielectric layer comprising a 130 Å thick film of zinc oxide and a 470 Å thick film of zinc stannate was deposited over the first primer layer. A second infrared reflective layer of silver having a thickness of 119 Å was deposited over the second dielectric layer. A second primer layer of titanium having a thickness of 27 Å was deposited over the second primer layer. A third dielectric layer comprising a 130 Å thick film of zinc oxide, a 483 Å thick film of zinc stannate and a 130 Å thick film of zinc oxide was deposited over the second primer layer. An overcoat layer comprised of 40% alumina and 60% silica was deposited at a thickness of 30 Å over the third dielectric layer.

A blocking layer comprising titania ($TiO_2$) was deposited at varying thicknesses over the second dielectric layer (between the second dielectric layer and a second silver layer). For Ex. 1, the thickness of the blocking layer was 20 Å. For Ex. 2, the thickness of the layer was 40 Å. And, for Ex. 3, the thickness of the layer was 60 Å.

The coated substrates were then heated subjected to standard tempering conditions. It is believed that during the heating process, the zinc stannate in the second dielectric layer was reduced and the tin ions in the zinc stannate layer became mobile and diffused into the second silver. The diffusion of tin ions imparted absorbance properties into the silver layer and led to the formation of the absorbing layer of the invention. As discussed earlier, the blocking layer reduces the amount of tin ions that diffuse into the infrared reflective layer.

Various terms are used to characterize the performance properties of glass substrates according to the present invention. A description of the terms appears below.

Luminous transmittance (LTA) was measured using C.I.E. 1931 standard illuminant "A" over the wavelength range 380 to 780 nm at 10 nanometer intervals in accordance with ASTM 308E-90.

Solar ultraviolet reflectance (SUVR) is the amount of ultraviolet energy reflected from a surface and was measured over the wavelength range from 300 nm to 400 nm at 5 nm intervals.

Solar infrared reflectance (SIRR) is the amount of infrared energy reflected from a surface and was measured over the wavelength range from 800 nm to 2100 nm at 50 nm intervals.

Total solar energy transmittance (TSET) is the total amount of solar energy transmitted through a substrate and was computed using Parry Moon air mass 2.0 solar data based on measured transmittances from 300 nm to 2100 nm at 50 nm intervals.

SUVR, SIRR and TSET were computed using Parry Moon air mass 2.0 solar data based on measured transmittances.

The L*, a*, b* values were based on CIE standard illuminant D65 and 10° observer.

The performance properties of the coated glass substrates according to the present invention are shown in Table 1 below. In the table, "R1" or a "R2" appears before selected measured properties. The "R1" refers to the measured property as being viewed from the coated side of the substrate. The "R2" refers to the measured property as being viewed from the uncoated side of the substrate.

TABLE 1

Performance Properties of a Coated Substrate According to the Present Invention

| | Example 1 | Example 2 | Example 3 |
| --- | --- | --- | --- |
| Lta [%] | 31.31 | 46.63 | 60.40 |
| R1SUVR [%] | 10.49 | 8.41 | 8.18 |
| R2SUVR [%] | 5.13 | 5.12 | 5.14 |
| R1SIRR [%] | 28.06 | 50.72 | 53.20 |
| R2SIRR [%] | 12.86 | 13.16 | 20.94 |
| TSET [%] | 20.05 | 27.61 | 33.83 |
| R1-L* | 48.89 | 36.39 | 37.83 |
| R2-L* | 45.18 | 43.67 | 42.56 |
| R1-a* | −9.13 | 15.81 | 0.44 |
| R2-a* | −9.39 | −6.61 | −10.85 |
| R1-b* | −7.78 | −3.95 | −4.59 |
| R2-b* | −4.10 | 3.81 | −0.39 |

As seen in Table 1, a coated substrate according to the present invention at a thickness of 0.16 inches can exhibit the following combination of performance properties. Generally, the thicker the blocking layer, the less metal ions get diffused into the infrared reflective layer and the higher the Lta and the higher the SIRR (i.e, the less effective a silver layer is as an absorbing layer, the better it is as an infrared reflecting layer).

For a substrate having a coating that initially includes two layers of silver, one of which gets subsequently converted into an absorbing layer: the Lta can range from 30% to 65%, for example 33% to 61%; the R1-L* can range from 35 to 50, for example, from 37 to 48; and the R2-L* can range from 41 to 47, for example, from 42 to 45.

Additional solar properties such as reflection of UV energy, reflection of IR energy and transmission of total solar energy were also recorded. For the coated side of Examples 1-3, the R1SVR ranged from 7% to 12%, for example, from 8% to 11% and the R1SIRR ranged from 28% to 55%, for example, from 30% to 53%. For the uncoated side of Examples 1-3, the R2SUVR ranged from 4% to 6%, for example, from 4.5% to 5.5% and the R2SIRR ranged from 12% to 21%, for example, from 13% to 18%.

It will be readily appreciated by those skilled in the art that modifications may be made to the invention without departing from the concepts disclosed in the foregoing description. Such modifications are to be considered as included within the scope of the invention. Accordingly, the particular embodiments described in detail hereinabove are illustrative only and are not limiting as to the scope of the invention, which is to be given the full breadth of the appended claims and any and all equivalents thereof.

What is claimed is:

1. A coating comprising:
   a. an infrared reflective layer;
   b. a primer layer over the infrared reflective layer;
   c. a dielectric layer over the primer layer; and
   d. an absorbing layer;
   wherein the absorbing layer can be either under the infrared reflective layer or over the dielectric layer;
   wherein the absorbing layer comprises an alloy and/or mixture of (a) a metal having an index of refraction at 500 nm less than or equal to 1.0 and (b) a material having a $\Delta G°_f$ of greater than or equal to −100 at 1,000°K; and
   wherein the metal is silver and the material is tin.

2. The coating according to claim 1, wherein the absorbing layer is deposited using a method selected from CVD spray pyrolysis, and MSVD.

3. The coating according to claim 1, wherein the absorbing layer has a thickness ranging from 20 Å to 300 Å.

4. The coating according to claim 1, wherein the dielectric layer comprises a material selected from metal oxides, oxides of metal alloys, nitrides, oxynitrides, and mixtures thereof.

5. The coating according to claim 4, wherein the dielectric layer comprises a metal oxide selected from an oxide of titanium, hafnium, zirconium, niobium, zinc, bismuth lead, indium, tin, and mixtures thereof.

6. The coating according to claim 4, wherein the dielectric layer comprises a zinc/tin alloy oxide ranging from 10 wt. % to 90 wt. % zinc and 90 wt. % to 10 wt. % tin.

7. The coating according to claim 1, wherein the infrared reflective layer comprises a material selected from silver, gold and copper.

8. The coating according to claim 1 deposited on a 0.16 inch thick clear glass substrate wherein the substrate exhibits an Lta of less than or equal to 50% and an L* of equal to or less than 52 from at least one side of the substrate.

* * * * *